United States Patent
Wang et al.

(10) Patent No.: US 10,547,793 B2
(45) Date of Patent: *Jan. 28, 2020

(54) CAMERA FLASH FOR IMPROVED COLOR BALANCE

(71) Applicant: BlackBerry Limited, Waterloo (CA)

(72) Inventors: Qian Wang, Redwood City, CA (US); Yun Seok Choi, Bothell, WA (US); Graham Charles Townsend, Menlo Park, CA (US); Sui Tong Tang, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/587,304

(22) Filed: May 4, 2017

(65) Prior Publication Data

US 2017/0237889 A1    Aug. 17, 2017

Related U.S. Application Data

(63) Continuation of application No. 13/425,264, filed on Mar. 20, 2012, now Pat. No. 9,681,058.

(Continued)

(51) Int. Cl.
  *H04N 5/235*  (2006.01)
  *H04N 9/04*  (2006.01)
  (Continued)

(52) U.S. Cl.
  CPC ......... *H04N 5/2354* (2013.01); *H04N 5/2256* (2013.01); *H04N 5/2351* (2013.01);
  (Continued)

(58) Field of Classification Search
  None
  See application file for complete search history.

(56) References Cited

U.S. PATENT DOCUMENTS 5,198,854 A    3/1993  Iwane
5,231,500 A    7/1993  Miyaji
(Continued)

FOREIGN PATENT DOCUMENTS

EP    2391118    11/2001
GB    2409287    6/2005
(Continued)

OTHER PUBLICATIONS

Office Action issued in Canadian Application No. 2,771,851 dated Mar. 17, 2016; 4 pages.

(Continued)

*Primary Examiner* — Mohammad J Rahman
(74) *Attorney, Agent, or Firm* — Fish & Richardson P.C.

(57) ABSTRACT

A camera unit and method of control are described. The camera unit has a camera flash sub-unit configurable to emit flash light having an adjustable characteristic. A camera sensor sub-unit generates raw color data when exposed to light for processing into a digital image. The camera unit also includes a camera controller for coordinating operation of the camera flash sub-unit and the camera sensor sub-unit. The camera controller monitors one or more ambient light characteristics in a vicinity of the camera unit. Prior to receiving a command instructing the camera unit to generate the digital image, the camera controller repeatedly configures the camera flash sub-unit based on the monitored ambient light characteristics to adjust the characteristics of the emitted flash light. Once the camera controller receives the command, the camera sensor sub-unit is instructed to expose an image sensor using the pre-adjusted camera flash light to increase illumination.

20 Claims, 5 Drawing Sheets

Related U.S. Application Data

(60) Provisional application No. 61/474,544, filed on Apr. 12, 2011.

(51) Int. Cl.
| | |
|---|---|
| *H04N 5/232* | (2006.01) |
| *H04N 5/225* | (2006.01) |
| *H04N 9/73* | (2006.01) |
| *H05B 37/02* | (2006.01) |
| *H05B 33/08* | (2006.01) |
| *H04N 101/00* | (2006.01) |

(52) U.S. Cl.
CPC ........... *H04N 5/23293* (2013.01); *H04N 9/04* (2013.01); *H04N 9/735* (2013.01); *H05B 33/0854* (2013.01); *H05B 33/0872* (2013.01); *H05B 37/0218* (2013.01); *H04N 2101/00* (2013.01)

(56) References Cited

U.S. PATENT DOCUMENTS

| | | | |
|---|---|---|---|
| 5,300,970 A | 4/1994 | Fukuhara | |
| 5,307,113 A * | 4/1994 | Egawa | G03B 17/00 348/E5.046 |
| 5,317,361 A | 5/1994 | Fukuhara | |
| 5,365,292 A | 11/1994 | Wakabayashi | |
| 5,400,113 A | 3/1995 | Sosa | |
| 5,526,079 A | 6/1996 | Goto | |
| 5,546,156 A | 8/1996 | Mcintyre | |
| 5,579,082 A | 11/1996 | Yokonuma | |
| 5,697,002 A | 12/1997 | Kanai | |
| 5,701,519 A | 12/1997 | Fukuhara | |
| 6,359,651 B1 | 3/2002 | Yokonuma | |
| 7,005,667 B2 | 2/2006 | Chen et al. | |
| 7,102,152 B2 | 9/2006 | Chua et al. | |
| 7,318,651 B2 | 1/2008 | Chua et al. | |
| 7,539,407 B2 | 5/2009 | Maeda | |
| 7,551,848 B2 | 6/2009 | Lee et al. | |
| 7,667,766 B2 | 2/2010 | Lee et al. | |
| 7,804,103 B1 | 9/2010 | Zhai et al. | |
| 7,834,372 B2 | 11/2010 | Zhai et al. | |
| 8,717,464 B2 | 5/2014 | Tang | |
| 9,104,271 B1 | 8/2015 | Adams | |
| 9,681,058 B2 * | 6/2017 | Wang | H04N 5/2354 |
| 2002/0076219 A1 * | 6/2002 | Uchino | G03B 17/48 396/429 |
| 2002/0080246 A1 | 6/2002 | Parulski | |
| 2002/0110372 A1 | 8/2002 | Fields | |
| 2002/0154910 A1 | 10/2002 | Iwasaki | |
| 2003/0007088 A1 | 1/2003 | Rantanen | |
| 2003/0189650 A1 * | 10/2003 | Gindele | H04N 9/735 348/223.1 |
| 2004/0109082 A1 | 6/2004 | Yokonuma | |
| 2004/0201766 A1 | 10/2004 | Funston et al. | |
| 2005/0104975 A1 | 5/2005 | Hayashi | |
| 2005/0134723 A1 | 6/2005 | Lee et al. | |
| 2007/0065006 A1 | 3/2007 | Wilensky | |
| 2007/0165960 A1 | 7/2007 | Yamada | |
| 2007/0196095 A1 | 8/2007 | Perala | |
| 2007/0264000 A1 * | 11/2007 | Hsieh | G03B 7/097 396/157 |
| 2008/0075447 A1 | 3/2008 | Wernersson | |
| 2008/0181597 A1 | 7/2008 | Tamura | |
| 2009/0002545 A1 | 1/2009 | Heinonen et al. | |
| 2009/0207301 A1 | 8/2009 | Fransson | |
| 2009/0243493 A1 | 10/2009 | Berquist | |
| 2009/0284613 A1 * | 11/2009 | Kim | G06T 5/50 348/222.1 |
| 2010/0013956 A1 * | 1/2010 | Furuya | G03B 7/08 348/229.1 |
| 2010/0020227 A1 | 1/2010 | Robinson et al. | |
| 2010/0124041 A1 * | 5/2010 | Druchinin | G03B 11/00 362/16 |
| 2010/0165178 A1 * | 7/2010 | Chou | G03B 13/32 348/371 |
| 2010/0189429 A1 | 7/2010 | Butterworth | |
| 2010/0245609 A1 * | 9/2010 | Estevez | H04N 5/2351 348/222.1 |
| 2010/0258828 A1 | 10/2010 | Ramer et al. | |
| 2010/0277618 A1 | 11/2010 | Hiratsuka | |
| 2011/0234846 A1 | 9/2011 | Drader | |
| 2012/0081385 A1 | 4/2012 | Cote | |
| 2012/0081566 A1 | 4/2012 | Cote | |
| 2012/0081567 A1 | 4/2012 | Cote | |
| 2012/0081577 A1 | 4/2012 | Cote | |
| 2012/0081578 A1 | 4/2012 | Cote | |
| 2012/0081580 A1 | 4/2012 | Cote | |
| 2016/0088278 A1 | 3/2016 | Velarde | |

FOREIGN PATENT DOCUMENTS

| | | |
|---|---|---|
| WO | 2008035234 | 3/2008 |
| WO | 2009118454 | 10/2009 |

OTHER PUBLICATIONS

Extended European Search report dated Jul. 18, 2012, in corresponding European patent application No. 12164007.2.

Black Body, Wikipedia Nov. 18, 2010, from http://en.wikipedia.org/wiki/Black_Body.

CIE 1931, Color Space, Oct. 27, 2010, from http://en.wikipedia.org/wiki/CIE_1931_color_space.

* cited by examiner

CAMERA FLASH FOR IMPROVED COLOR BALANCE

CROSS-REFERENCE TO RELATED APPLICATION

This application is a continuation and claims priority to U.S. patent application Ser. No. 13/425,264, filed Mar. 20, 2012, which claims priority to U.S. Provisional Patent Application No. 61/474,544, filed Apr. 12, 2011, the content of which is hereby incorporated by reference.

FIELD

The described embodiments relate generally to a camera flash module for a digital camera and, more particularly, to a camera flash module having a quantum dot illuminant to provide controllable color temperature for improved color balance.

BACKGROUND

Digital photography is a form of photography that uses an image sensor formed out of an array of photosensitive pixels to capture images of a scene. As opposed to film photography, which exposes light sensitive film, digital photography renders images using the photosensitive pixels to convert light photons into accumulated charge. Typically each pixel in the array is photosensitive to a certain range of light corresponding to one of the primary color components used by the image sensor to represent color. An infrared cutoff filter and one or more color filter layers are commonly overlaid on the image sensor pixel array to achieve selective pixel photosensitivity.

An image processor linked to the image sensor then typically determines corresponding intensities of each raw color component (e.g., red, green and blue) by measuring the amount of accumulated charge in each type of pixel. In some cases, the raw color components are also de-mosaiced to generate full color pixel representations. Accordingly, pixels in the resulting digital image are represented by a plurality of color component values, which may be red, green and blue color components, although other digital color representations exist as well.

A digital camera is typically equipped with a camera flash module or sub-unit. In conditions of low ambient light or scene illumination, the camera flash module emits a flash of artificially generated light during image capture. Together with the available ambient light, the flash light emitted from the camera flash module increases overall scene illumination to allow for brighter images.

BRIEF DESCRIPTION OF DRAWINGS

For a better understanding of the described embodiments and to show more clearly how such embodiments may be carried into effect, reference will now be made, by way of example, to the accompanying drawings in which.

DESCRIPTION OF EMBODIMENTS

Figure 1:
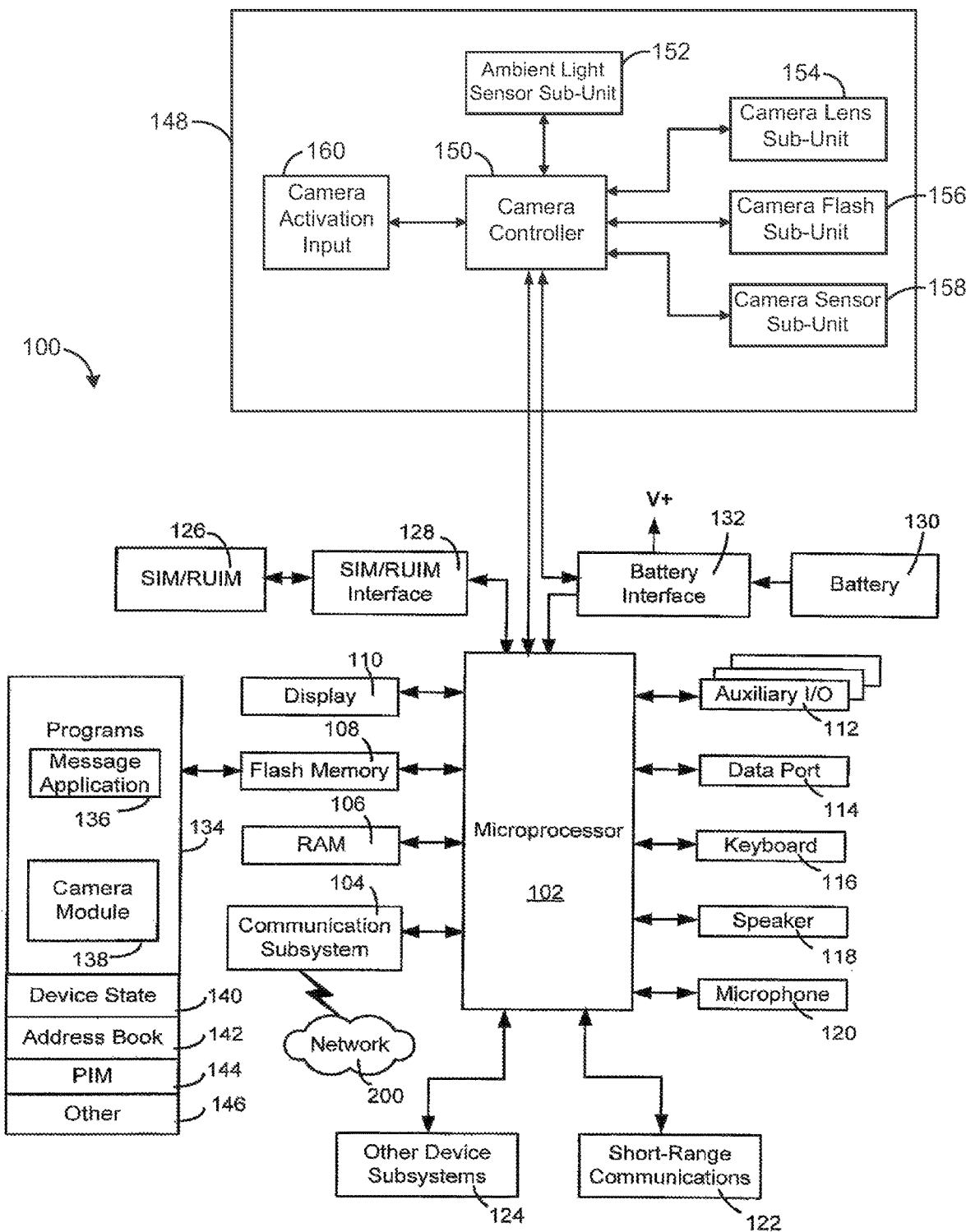
FIG. 1 is a block diagram of a mobile device having a camera unit in one example implementation.

Images generated by a digital camera under different ambient light conditions may appear differently or have different image attributes. For example, two images of the same scene generated by a digital camera may appear differently depending on the color temperature of the ambient light used to expose the scene. The term "color temperature", used in the context of ambient light, may generally refer to the particular spectral composition of the ambient light, such as the relative intensities of different sub-ranges of visible light. For example, light may generally be referred to as being "cool" when the light contains a relatively large blue or violet component. On the other hand, light may be referred to as being "warm" when a relatively large red or orange light component is present. If color temperature is not taken into account, digital images generated under different ambient light conditions may contain particular color casts. While the effect may sometimes be intentional, often color casts are undesirable and unsightly.

In general, color balancing is a digital process that involves a global adjustment of different color component intensities present in the digital image (typically represented by red, green, and blue primary colors) in order to render certain specific colors correctly. White balance is a particular type of color balance that aims to properly render neutral (e.g., grayscale) colors correctly, and that may generally be used to remove color casts appearing in digital pictures that might otherwise occur due to the color temperature of ambient light during image exposure. However, more generalized versions of color balance may also be applied to digital images in order to render colors other than neutral colors correctly or more pleasingly.

A digital camera may have multiple different white balance algorithms available for processing raw image data to generate color balanced images. In some cases, each different white balance algorithm may be optimized to remove a different color cast caused by a different color temperature of ambient light. To select an appropriate white balancing algorithm, therefore, the color temperature of the ambient light may be estimated and the white balance algorithm most suitable for that temperature of ambient light may be used. Many digital cameras are equipped to make this determination automatically, although some digital cameras also may allow a user to manually set the ambient light color temperature for the purpose of performing white balancing.

Different sources of ambient light may also generally have different color temperatures. For example, natural light may have a different color temperature than incandescent or fluorescent light. Natural light may also have a different color temperature on sunny days as compared to overcast conditions. If the image sensor of the digital camera is exposed with ambient light from two or more light sources having generally different color temperatures, different objects in the resulting digital image may acquire different color casts. A white balance algorithm optimized for only a single color temperature may therefore perform sub-optimally over a range of different color temperatures.

Mixed light conditions are prevalent in flash photography because many existing camera flash modules emit artificial light of a fixed color temperature, which usually does not exactly match the color temperature of the natural ambient light with which the artificial light mixes. As a result, mixed or multiple light sources illuminate the scene during image exposure, with each light source (i.e., ambient light and flash light) contributing light of a different color temperature to the overall scene illumination. Proper color balancing of digital images illuminated in part by flash light may therefore be difficult in many cases.

One approach to performing color balancing in digital images illuminated at least in part by camera flash is to correct for the color temperature of the flash light, while effectively leaving any color casts due to the natural ambient light uncorrected. If the level of the natural ambient light is relatively low in comparison to the flash light (generally a fair assumption if the camera flash is being employed to increase illumination), the intensity of the artificial camera flash light will tend to predominate over the intensity of the natural ambient light. Accordingly, performing white balancing based only on the color temperature of the artificial camera flash will often suffice.

However, it may not always be the case that the intensity of the artificial camera flash predominates over the intensity of the natural ambient light. If the camera flash module is designed to produce a fixed luminance, the effective intensity of the artificial flash light may thereby depend on the distance between the camera and the image object. Closer objects tend to reflect more of the camera flash light and appear brighter than objects that are further away from the camera. Therefore, if the image object is far enough away from the camera, the intensity of the natural ambient light in the scene may be commensurate with or even greater than that of the artificial camera flash light. In such cases, performing white balancing based on the color temperature of the artificial camera flash light may produce poor quality images that have strong and unsightly residual color casts caused by the uncorrected ambient light.

Color temperature may be estimated prior to scene exposure using a separate light sensor. However, to reduce cost and bulk, many smaller digital cameras (e.g., handheld or point-and-shoot cameras) will only contain a single multi-purpose image sensor. In addition to performing image capture, pre-image data generated by the image sensor may be processed in order to sense one or more characteristics of the ambient light, such as intensity and color temperature.

While use of a single multi-purpose image sensor may tend to reduce cost and bulk, one drawback of this approach is increased processing time and use of computational resources. For example, estimating the intensity or color temperature of the ambient light from pre-image data generated by the image sensor will generally create a certain processing load, which is required in addition to any processing load already allocated to perform white balancing or other resident image processing functions of the digital camera, such as gamma correction, exposure compensation, enhancement or others. The extra processing functions incur additional delay between the time the user depresses the shutter button to initiate picture taking and the time the resulting digital image can be displayed back to the user, for example, on a view screen or other display of the digital camera. During this delay (sometimes referred to as "shutter lag"), either the subject of the picture or the user may have moved resulting in the camera not capturing the intended scene image. As shutter lag may cause the user frustration, minimizing the length of the shutter lags may improve the user's experience and result in higher quality pictures being produced.

In one broad aspect, the described embodiments relate to a method for controlling a camera unit having a camera flash sub-unit for emitting flash light to generate a digital image. The method includes monitoring one or more characteristics of ambient light in a vicinity of the camera unit; receiving a command for instructing the camera unit to generate the digital image; prior to receiving the command, repeatedly configuring the camera flash sub-unit based on the monitored characteristic of the ambient light to adjust one or more characteristics of the flash light emitted by the camera flash sub-unit; and after receiving the command, exposing an image sensor of the camera unit to generate raw color data for processing into the digital image using the adjusted flash light emitted by the camera flash sub-unit to increase illumination.

In some embodiments, the camera flash sub-unit may be configured based on the monitored one or more characteristics of the ambient light by matching the one or more characteristics of the flash light to the monitored one or more characteristics of the ambient light.

In some embodiments, the method further includes: prior to receiving the command, selecting an algorithm based on the monitored one or more characteristics of the ambient light for performing color balancing; and after receiving the command, processing the raw color data using the selected color balancing algorithm.

In some embodiments, the one or more characteristics of ambient light may be monitored by: prior to receiving the command, repeatedly pre-exposing the image sensor to generate pre-image data; and processing the pre-image data to determine the monitored one or more characteristics of the ambient light.

In some embodiments, the pre-image data may be processed to determine the monitored characteristic of the ambient light by, for each pre-exposure of the image sensor: determining one or more new values based on the pre-image data, each new value being representative of one of the one or more characteristics of the ambient light; and updating one or more old values with the one or more new values, each old value being representative of the one of the one or more characteristics of the ambient light for a previous pre-exposure of the image sensor.

In some embodiments, the one or more characteristics of ambient light may be monitored and the camera flash sub-unit may be configured in real time over a time period occurring prior to receipt of the command.

In some embodiments, the one or more characteristics of ambient light may be monitored and the camera flash sub-unit may be configured at discrete intervals over a time period occurring prior to receipt of the command.

In some embodiments, the discrete intervals may be substantially equally spaced in time.

In some embodiments, the method further includes displaying one or more values on a user interface of the camera unit prior to receiving the command, each value being representative of one of the monitored one or more characteristics of ambient light.

In some embodiments, the method further includes receiving input at the user interface to adjust the configuration of the camera flash sub-unit.

In some embodiments, the monitored one or more characteristics of the ambient light include a color temperature of the ambient light and the adjusted one or more characteristics of the flash light include a color temperature of the flash light.

In another broad aspect, the described embodiments relate to a camera unit for generating a digital image. The camera unit includes: a camera flash sub-unit comprising a plurality of emissive light sources arranged to emit flash light having an adjustable characteristic; a camera sensor sub-unit comprising an image sensor configured to generate raw color data when exposed for processing into the digital image; and a camera controller coupled to the camera flash sub-unit and the camera sensor sub-unit for coordinating operation thereof. The camera controller is configured to: monitor one or more characteristics of ambient light in a vicinity of the camera unit; receive a command for instructing the camera unit to generate the digital image; prior to receiving the command, repeatedly configure the plurality of emissive sources in the camera flash sub-unit based on the monitored one or more characteristics of the ambient light to adjust one or more characteristics of the flash light emitted by the camera flash sub-unit; and after receiving the command, instruct the camera sensor sub-unit to expose the image sensor using the adjusted flash light emitted by the camera flash sub-unit to increase illumination.

In some embodiments, the camera controller is configured to control the plurality of emissive sources in the camera flash sub-unit to match the one or more characteristics of the flash light to the monitored one or more characteristics of the ambient light.

In some embodiments, the camera sensor sub-unit further includes an image sensor processor coupled to the image sensor and configured to process the raw color data generated by the image sensor into the digital image.

In some embodiments, the camera controller is configured to: prior to receiving the command, instruct the image sensor processor to select an algorithm based on the monitored one or more characteristics of the ambient light for performing color balancing; and after receiving the command, instruct the image sensor processor to process the raw color data using the selected color balancing algorithm.

In some embodiments, the camera controller is configured to monitor the one or more characteristics of the ambient light by instructing the camera sensor sub-unit to: prior to receiving the command, repeatedly pre-expose the image sensor to generate pre-image data; and process the pre-image data using the image sensor processor to determine the monitored one or more characteristics of the ambient light.

In some embodiments, the image sensor processor is configured to process the pre-image data to determine the monitored one or more characteristics of the ambient light by, for each pre-exposure of the image sensor: determining one or more new values based on the pre-image data, each new value being representative of one of the one or more characteristics of the ambient light; and updating one or more old values with the one or more new values, each old value being representative of the one of the one or more characteristics of the ambient light for a previous pre-exposure of the image sensor.

In some embodiments, the camera controller is configured to monitor the one or more characteristics of ambient light and to configure the plurality of emissive sources in the camera flash sub-unit in real time over a time period occurring prior to receipt of the command.

In some embodiments, the camera controller is configured to monitor the one or more characteristics of ambient light and to configure the plurality of emissive sources in the camera flash sub-unit at discrete intervals over a time period occurring prior to receipt of the command.

In some embodiments, the discrete intervals are substantially equally spaced in time.

In some embodiments, the camera unit further includes a user interface for displaying one or more values prior to the camera controller receiving the command, each value being representative of one of the monitored one or more characteristics of ambient light.

In some embodiments, the user interface is configured to receive input to adjust the configuration of the camera flash sub-unit.

In some embodiments, the monitored one or more characteristics of the ambient light include a color temperature of the ambient light and the adjusted one or more characteristics of the flash light include a color temperature of the flash light.

In some embodiments, the camera unit is included in a mobile communication device.

In another broad aspect, the described embodiments relate to a non-transitory computer-readable storage medium storing instructions executable by one or more processors coupled to the storage medium. When executed, the stored instructions program the one or more processors to control a camera unit having a camera flash sub-unit for emitting flash light to generate a digital image. The stored instructions include: monitoring one or more characteristics of ambient light in a vicinity of the camera unit; receiving a command for instructing the camera unit to generate the digital image; prior to receiving the command, repeatedly configuring the camera flash sub-unit based on the monitored one or more characteristics of the ambient light to adjust one or more characteristics of the flash light emitted by the camera flash sub-unit; and after receiving the command, exposing an image sensor of the camera unit to generate raw color data for processing into the digital image using the adjusted flash light emitted by the camera flash sub-unit to increase illumination.

To aid the reader in understanding the general structure and operation of the mobile device, reference will be made to FIGS. 1 to 3. However, it should be understood that embodiments of the mobile device are not limited only to that which is described herein. Examples of different mobile devices generally include any portable electronic device that includes a camera module such as cellular phones, cellular smartphones, wireless organizers, personal digital assistants, computers, laptops, handheld wireless communication devices, wireless enabled notebook computers, wireless Internet appliances, and the like. These mobile devices are generally portable and thus are battery-powered. However, the described embodiments are not limited only to portable, battery-powered electronic devices. While some of these devices include wireless communication capability, others are standalone devices that do not communicate with other devices.

Referring to FIG. 1, shown therein is a block diagram of a mobile device 100 in one example implementation. The mobile device 100 comprises a number of components, the controlling component being a microprocessor 102, which controls the overall operation of the mobile device 100. Communication functions, including data and voice communications, are performed through a communication subsystem 104. The communication subsystem 104 receives messages from and sends messages to a wireless network 200. In this exemplary implementation of the mobile device 100, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that the new standards will have similarities to the network behaviour described herein, and it will also be understood by persons skilled in the art that the embodiment described herein is intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with the mobile device 100 is a GSM/GPRS wireless network in one example implementation, other wireless networks can also be associated with the mobile device 100 in variant implementations. The different types of wireless networks that can be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The microprocessor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122 and other device subsystems 124.

Some of the subsystems of the mobile device 100 perform communication-related functions, whereas other subsystems can provide "resident" or on-device functions. By way of example, the display 110 and the keyboard 116 can be used for both communication-related functions, such as entering a text message for transmission over the network 200, and device-resident functions such as a calculator or task list. Operating system software used by the microprocessor 102 is typically stored in a persistent store such as the flash memory 108, which can alternatively be a read-only memory (ROM) or similar storage element (not shown). Those skilled in the art will appreciate that the operating system, specific device applications, or parts thereof, can be temporarily loaded into a volatile store such as the RAM 106.

The mobile device 100 can send and receive communication signals over the wireless network 200 after required network registration or activation procedures have been completed. Network access is associated with a subscriber or user of the mobile device 100. To identify a subscriber, the mobile device 100 requires a SIM/RUIM card 126 (i.e. Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all subscribed services. Services can include: web browsing and messaging such as e-mail, voice mail, SMS, and MMS. More advanced services can include: point of sale, field service and sales force automation. The SIM card/RUIM 126 includes a processor and memory for storing information. Once the SIM card/RUIM 126 is inserted into the SIM/RUIM interface 128, the SIM card/RUIM 126 is coupled to the microprocessor 102. In order to identify the subscriber, the SIM card/RUIM 126 contains some user parameters such as an International Mobile Subscriber Identity (IMSI). An advantage of using the SIM card/RUIM 126 is that a subscriber is not necessarily bound by any single physical mobile device. The SIM card/RUIM 126 can store additional subscriber information for a mobile device as well, including datebook (or calendar) information and recent call information. Alternatively, user identification information can also be programmed into the flash memory 108.

The mobile device 100 is a battery-powered device and includes a battery interface 132 and uses one or more rechargeable batteries in a battery module 130. The battery interface 132 is coupled to a regulator (not shown), which assists the battery module 130 in providing power V+ to the mobile device 100. Alternatively, the battery module 130 can be a smart battery as is known in the art. Smart batteries generally include a battery processor, battery memory, switching and protection circuitry, measurement circuitry and a battery module that includes one or more batteries, which are generally rechargeable. In either case, the one or more batteries in the battery module 130 can be made from lithium, nickel-cadmium, lithium-ion, or other suitable composite material.

In addition to operating system functions, the microprocessor 102 enables execution of software applications 134 on the mobile device 100. The subset of software applications 134 that control basic device operations, including data and voice communication applications, will normally be installed on the mobile device 100 during manufacturing of the mobile device 100.

The software applications 134 include a message application 136 that can be any suitable software program that allows a user of the mobile device 100 to send and receive electronic messages. Various alternatives exist for the message application 136 as is well known to those skilled in the art. Messages that have been sent or received by the user are typically stored in the flash memory 108 of the mobile device 100 or some other suitable storage element in the mobile device 100. In an alternative embodiment, some of the sent and received messages can be stored remotely from the device 100 such as in a data store of an associated host system that the mobile device 100 communicates with. For instance, in some cases, only recent messages can be stored within the device 100 while the older messages can be stored in a remote location such as the data store associated with a message server. This can occur when the internal memory of the device 100 is full or when messages have reached a certain "age", i.e. messages older than 3 months can be stored at a remote location. In an alternative implementation, all messages can be stored in a remote location while only recent messages can be stored on the mobile device 100.

The mobile device 100 further includes a camera module 138, a device state module 140, an address book 142, a Personal Information Manager (PIM) 144, and other modules 146. The camera module 138 is used to control camera operations for the mobile device 100. Additionally, the camera module 138 is used to control a maximum camera current that can be drawn from the battery module 130 without adversely affecting the operation of the mobile device 100, such as causing brown-out, reset, affecting the operation of any applications being performed by the mobile device 100 and the like.

The device state module 140 provides persistence, i.e. the device state module 140 ensures that important device data is stored in persistent memory, such as the flash memory 108, so that the data is not lost when the mobile device 100 is turned off or loses power. The address book 142 provides information for a list of contacts for the user. For a given contact in the address book 142, the information can include the name, phone number, work address and email address of the contact, among other information. The other modules 146 can include a configuration module (not shown) as well as other modules that can be used in conjunction with the SIM/RUIM interface 128.

The PIM 144 has functionality for organizing and managing data items of interest to a subscriber, such as, but not limited to, e-mail, calendar events, voice mails, appointments, and task items. A PIM application has the ability to send and receive data items via the wireless network 200. PIM data items can be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

Additional applications can also be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and can provide enhanced on-device functions, communication-related functions, or both. For example, secure communication applications can enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path can, for example, be used to load an encryption key onto the mobile device 100 through a direct and thus reliable and trusted connection to provide secure device communication.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the mobile device 100.

The short-range communications subsystem 122 provides for communication between the mobile device 100 and different systems or devices, without the use of the wireless network 200. For example, the subsystem 122 can include an infrared device and associated circuits and components for short-range communication. Examples of short-range communication include standards developed by the Infrared Data Association (IrDA), Bluetooth ™, and the 802.11 family of standards developed by IEEE.

In use, a received signal such as a text message, an e-mail message, or web page download will be processed by the communication subsystem 104 and input to the microprocessor 102. The microprocessor 102 will then process the received signal for output to the display 110 or alternatively to the auxiliary I/O subsystem 112. A subscriber can also compose data items, such as e-mail messages, for example, using the keyboard 116 in conjunction with the display 110 and possibly the auxiliary I/O subsystem 112. The auxiliary subsystem 112 can include devices such as a touch screen, mouse, track ball, infrared fingerprint detector, or a roller wheel with dynamic button pressing capability. The keyboard 116 is preferably an alphanumeric keyboard and/or telephone-type keypad. However, other types of keyboards can also be used. A composed item can be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

The mobile device 100 also includes a camera unit 148 that allows a user of the mobile device 100 to take pictures. The camera unit 148 includes a camera controller 150, an optional ambient light sensor sub-unit 152, a camera lens sub-unit 154, a camera flash sub-unit 156, a camera sensor sub-unit 158, a camera user interface (not shown) and a camera activation input 160. The camera controller 150 configures the operation of the camera unit 148 in conjunction with information and instructions received from the microprocessor 102. It should be noted that the structure shown for the camera unit 148 and the description that follows is only one example of an implementation of a camera on a mobile device and that the technique of determining maximum flash current should not be limited to this particular example embodiment.

The camera controller 150 receives activation signals 161 from the camera activation input 160 indicating commands from the user. In alternative embodiments, the microprocessor 102 receives the activation signal 161. A first type of activation signal 161 may be a camera initiation command, such as an on/off command. A second type of activation signal 161 may be a command instructing the camera unit to generate the digital image, hereafter referred to as a "take picture command." Typically, the camera activation input 160 comprises one or more push-buttons that is depressed by the user.

However, the camera activation input 160 can also comprise a switch or some other appropriate input mechanism as is known by those skilled in the art. In alternative embodiments, the camera activation input 160 is used to initiate a camera mode on the mobile device 100 by executing the camera module 138 in the flash memory 108 such that the mobile device 100 can be used to take pictures in the camera mode.

Depending on the particular configuration that is employed, the camera lens sub-unit 154 includes a lens along with a shutter and/or aperture along with components to open and close the shutter and/or aperture to expose an image sensor in the camera sensor sub-unit 158. The shutter and/or aperture may be opened once upon actuation of the camera activation input 160. In some embodiments, the shutter and/or aperture stays open so long as the mobile device 100 is in the camera mode, in which case pre-image data is continuously or semi-continuously generated by the image sensor until a take picture command is received. Alternatively, the shutter and/or aperture may be opened and closed each time a picture is taken so that the image sensor is exposed only once in response to receipt of the take picture command. Additionally, or instead of these components, the camera lens sub-unit 154 can include components that provide telescopic functionality to allow the user to take a "zoomed-in" or "zoomed-out" picture.

The camera flash sub-unit 156 includes a camera flash module to generate artificial flash light having an appropriate magnitude or lumen to increase the quality of the digital images that are obtained by the camera unit 148. In some cases, the light output of the camera flash sub-unit 156 can be limited by the maximum current draw available from the battery module 130 for flash purposes. For example, to avoid excessive "battery slump", a maximum camera flash current can be enforced. The camera flash sub-unit 156 is typically based on LED flash technology, but in some embodiments can also incorporate phosphor materials and/or quantum dot layers to adjust the spectral quality of the generated flash light. As explained further below, the phosphor materials and/or quantum dot layers may be used to provide flash light having one or more adjustable characteristics, such as intensity or color temperature. The camera flash sub-unit 156 can be operated in a camera flash mode of operation of the camera unit 148, while being deactivated in other modes of operation. The camera flash sub-unit 156 may be configured and controlled by the camera controller 150 through flash control signal 268 sent from the camera controller to the camera flash sub-unit 156.

The camera sensor sub-unit 158 captures and processes raw color data using an image sensor, which is then processed in an image sensor processor to generate a processed digital color image. The image sensor can be fabricated using, for example, CMOS sensor technology, CCD sensor technology as well as other sensor technologies. The image sensor can incorporate pixels that are sensitive to light in different parts of the light spectrum corresponding to primary color components for digital color representation. Based upon the selected camera mode of operation, the image sensor processor receives and processes the raw color data from the image sensor to generate the processed digital image. Additional image processing functions can also be performed by the image sensor processor.

The camera user interface displays information pertaining to various modes of operation and configuration of camera sub-units. For example, the camera user interface may display an image representing an exposed or pre-exposed image to the user. Measured characteristics of the ambient light may also be displayed to the user using the camera user interface. Where the camera unit 148 is included on a mobile device 100, the user interface may be the display 110.

Figure 2:
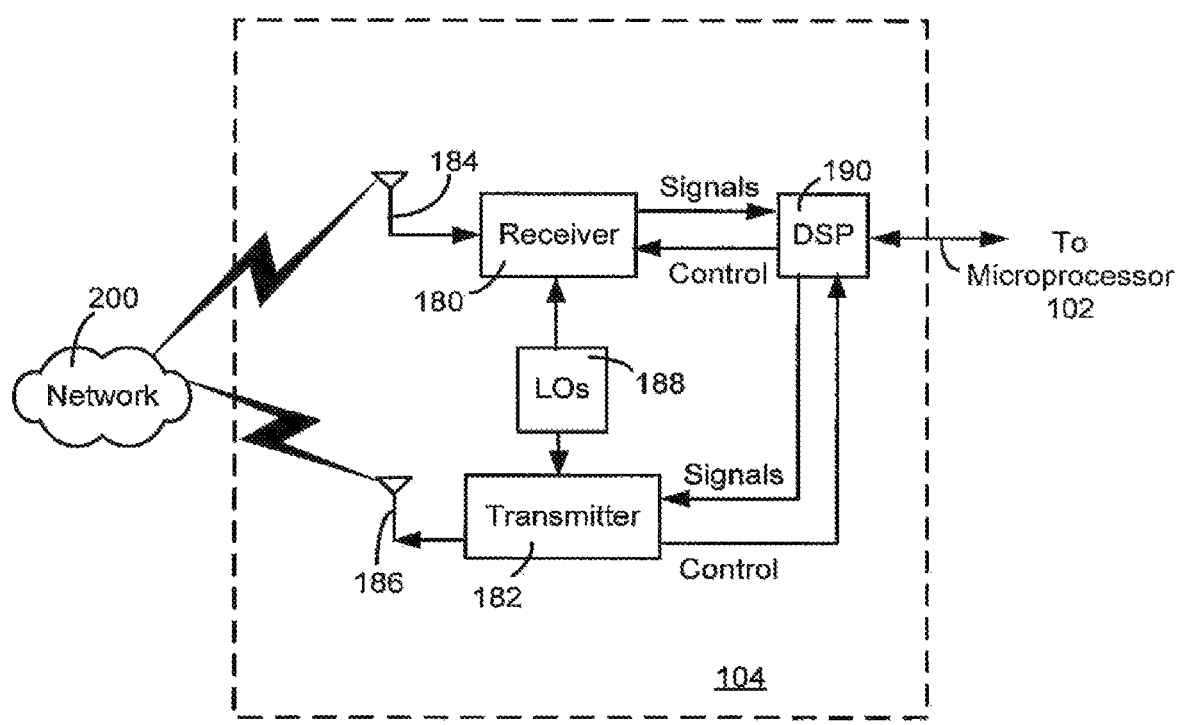
FIG. 2 is a block diagram of an example embodiment of a communication subsystem component of the mobile device shown in FIG. 1.

Referring now to FIG. 2, a block diagram of the communication subsystem component 104 of FIG. 1 is shown. Communication subsystem 104 comprises a receiver 180, a transmitter 182, one or more embedded or internal antenna elements 184, 186, Local Oscillators (LOs) 188, and a processing module such as a Digital Signal Processor (DSP) 190.

The particular design of the communication subsystem 104 is dependent upon the network 200 in which mobile device 100 is intended to operate, thus it should be understood that the design illustrated in FIG. 2 serves only as one example. Signals received by the antenna 184 through the network 200 are input to the receiver 180, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 190. In a similar manner, signals to be transmitted are processed, including modulation and encoding, by the DSP 190. These DSP-processed signals are input to the transmitter 182 for digital-to-analog (D/A) conversion, frequency up conversion, filtering, amplification and transmission over the network 200 via the antenna 186. The DSP 190 not only processes communication signals, but also provides for receiver and transmitter control. For example, the gains applied to communication signals in the receiver 180 and the transmitter 182 may be adaptively controlled through automatic gain control algorithms implemented in the DSP 190.

The wireless link between the mobile device 100 and a network 200 may contain one or more different channels, typically different RF channels, and associated protocols used between the mobile device 100 and the network 200. An RF channel is a limited resource that must be conserved, typically due to limits in overall bandwidth and limited battery power of the mobile device 100.

When the mobile device 100 is fully operational, the transmitter 182 is typically keyed or turned on only when the transmitter 182 is sending to the network 200 and is otherwise turned off to conserve resources. Similarly, the receiver 180 is periodically turned off to conserve power until the receiver 180 is needed to receive signals or information (if at all) during designated time periods.

Figure 3:
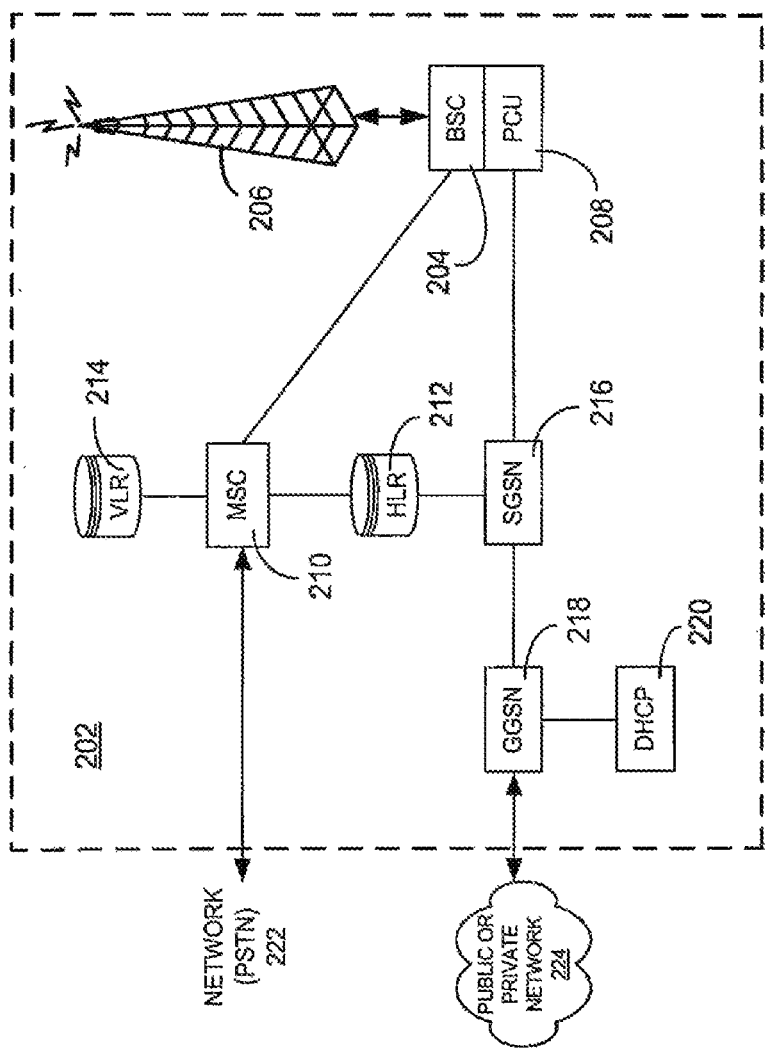
FIG. 3 is a block diagram of a node of a wireless network in one example implementation.

Referring now to FIG. 3, a block diagram of a node of a wireless network is shown as 202. In practice, the network 200 comprises one or more nodes 202. The mobile device 100 communicates with a node 202 within the wireless network 200. In the exemplary implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to the public or private network (Internet) 224 (also referred to herein generally as a shared network infrastructure) represents the data path for GPRS capable mobile devices. In a GSM network extended with GPRS capabilities, the BSC 204 also contains a Packet Control Unit (PCU) 208 that connects to the SGSN 216 to control segmentation, radio channel allocation and to satisfy packet switched requirements. To track mobile device location and availability for both circuit switched and packet switched management, the HLR 212 is shared between the MSC 210 and the SGSN 216. Access to the VLR 214 is controlled by the MSC 210.

The station 206 is a fixed transceiver station. The station 206 and the BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within the cell via the station 206. The fixed transceiver equipment normally performs such functions as modulation and possibly encoding and/or encryption of signals to be transmitted to the mobile device in accordance with particular, usually predetermined, communication protocols and parameters, under control of a controller. The fixed transceiver equipment similarly demodulates and possibly decodes and decrypts, if necessary, any communication signals received from the mobile device 100 within the cell. Communication protocols and parameters may vary between different nodes. For example, one node may employ a different modulation scheme and operate at different frequencies than other nodes.

For all mobile devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in the location areas in the VLR 214 for which the MSC 210 is responsible. Further the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support; namely packet switched data support, within GSM. The SGSN 216 and the MSC 210 have similar responsibilities within wireless network 200 by keeping track of the location of each mobile device 100. The SGSN 216 also performs security functions and access control for data traffic on the network 200. The GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through the PCU 208 and the SGSN 216 to an Access Point Node (APN) within the GGSN 218. The APN represents a logical end of an IP tunnel that can either access direct Internet compatible services or private network connections. The APN also represents a security mechanism for the network 200, insofar as each mobile device 100 must be assigned to one or more APNs and the mobile devices 100 cannot exchange data without first performing a GPRS Attach to an APN that the mobile device 100 has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a mobile device 100 is not using the PDP Context allocated to the mobile device 100, the PDP Context can be de-allocated and the IP address returned to the IP address pool managed by the DHCP server 220.

Figure 4:
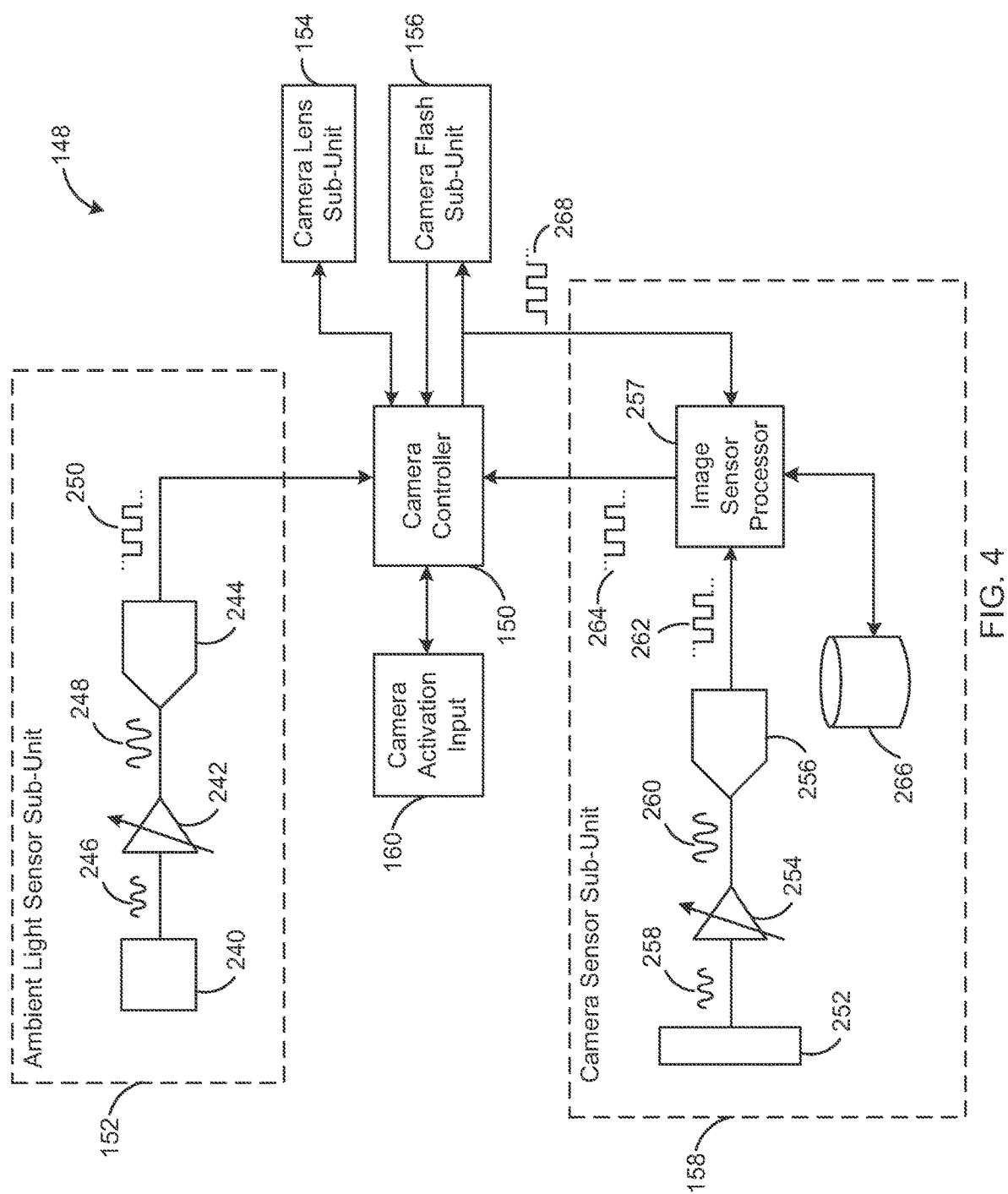
FIG. 4 is a block diagram of an example embodiment of an image sensor sub-unit of the camera unit shown in FIG. 1.

Referring now generally to FIG. 4, the multi-mode operation of the camera unit 148 is explained in greater detail. For convenience, the following embodiments of the camera unit 148 are described in the context of a camera unit for a mobile communication device, such as the mobile device 100 (FIG. 1). However, it should be appreciated that the described embodiments may also be suitable for other types and configurations of camera modules and are not necessarily limited just to camera modules incorporated into mobile communication devices. For example, the described embodiments may be equally well suited for stand-alone digital camera modules, video camera modules, and the like.

As seen in FIG. 4, in one example implementation, the camera unit 148 includes a camera controller 150, an optional ambient light sensor sub-unit 152, a camera lens sub-unit 154, a camera flash sub-unit 156, a camera sensor sub-unit 158, and a camera activation input 160. While reference may be made in the following description primarily to the camera controller 150, the ambient light sensor sub-unit 152, the camera flash sub-unit 156, and the camera sensor sub-unit 158, further description of the camera lens sub-unit 154 and the camera activation input 160 may be found above with reference to FIG. 1.

The camera sensor sub-unit 158 includes both hardware components and software components for capturing and processing digital color images. In an example implementation, the camera sensor sub-unit 158 includes an image sensor 252, variable gain amplifier (VGA) 254, digital to analog converter (DAC) 256 and image sensor processor (ISP) 257. However, it should be appreciated that in variant embodiments, some of the components of the camera sensor sub-unit 158 shown in FIG. 4 may be re-allocated to one or more different modules. For example, some of the software and/or processing components of the camera sensor sub-unit 158, such as the image sensor processor 257, may be realized in other camera sub-units. The particular association of components in FIG. 4 is merely illustrative.

Image sensor 252 is a pixilated, photosensitive array used to capture scene images when exposed to light (either ambient or camera flash), such as by opening a camera shutter (not shown) within the camera lens sub-unit 154. For the duration that the camera shutter is opened, a camera lens (not shown) focuses light through an aperture onto the light sensor 252. The image sensor 252 captures the exposed image initially as raw sensor pixel data encoded into a sensor output signal 258.

The image sensor 252 may be synthesized on a single image sensor chip that has a plurality of pixels arranged into a square or rectangular array. In some embodiments, each pixel in the array includes at least one crystalline quantum dot layer that is photosensitive to a particular frequency range of the light spectrum. As will be appreciated, the photosensitivity of the individual pixels to different wavelengths of light may depend generally on the bandgap energy of the quantum dots used to fabricate the pixel. For crystalline quantum dot pixels, the bandgap energy is controllable with good precision based on the lattice spacing of the underlying crystalline quantum dot layer. Thus, photosensitivity may be controlled during fabrication as a function of lattice spacing.

A vertical stack of quantum dot layers may be used to fabricate pixels on the image sensor 252 having different spectral sensitivity. For example, the stack of quantum dot layers may include a top blue layer, a middle green layer, and a bottom red layer. Photons of light that are incident on the stack of quantum dot layers will be progressively absorbed into one of the quantum dot layers roughly corresponding to the color intensity of the incident light, depending on the specific bandgap energies of the various quantum dot layers. Thus, higher energy blue light is absorbed into the blue layer, while lower energy green light passes through the blue layer to the underlying green layer wherein the lower energy green light is absorbed. Similarly red light may pass through both the blue and green layers to the underlying red light wherein the still lower energy red light is absorbed. With this configuration of the quantum dot layers, the image sensor 252 may comprise pixels that separately detect each of blue, green, and red light intensities.

However, in alternative embodiments, image sensor 252 may be realized instead using a charge-coupled device (CCD) or complementary metal oxide semiconductor (CMOS) sensor. Because the light sensitivity of CCD and CMOS sensors may typically not be as controllable as quantum dot light sensors, color filters may be layered on top of the underlying CCD or CMOS substrate to provide selective spectral photosensitivity to different wavelengths of light. In this way, the image sensor 252 again may generate a sensor output signal 258 consisting of raw sensor pixel data specific to different regions of the input light spectrum.

Image sensor 252 generates the sensor output signal 258 encoding sensor data by sequentially sensing the electrical charge accumulated in each sensor pixel after exposure. The sensor output signal 258 is amplified by VGA 254 to generate an amplified sensor output signal 260. Digital to analog converter 256 then digitizes the amplified sensor output signal 260 to produce raw digital image data 262. For example, raw digital image data 262 may consist of a bitstream of different single component pixel values, with each single component pixel value sensed from a different pixel of the image sensor 252.

The camera flash sub-unit 156 includes a camera flash module (not shown) to generate artificial flash light having an appropriate magnitude or lumen to increase the quality of the digital images that are generated by the camera unit 148. As described above, the camera flash sub-unit 156 may typically be based on LED flash technology, but in some embodiments can also incorporate phosphor materials and/ or quantum dot layers to adjust the spectral quality or composition of the generated flash light. For example, the camera flash sub-unit 156 may comprise a plurality of LED modules or other emissive light sources arranged in close proximity. One or more current drivers may also be included in the camera flash sub-unit 156 for driving the LED modules to generate light.

In some embodiments, the plurality of LED modules may incorporate phosphor materials and/or quantum dot layers, such that each of the LED modules emits light in a sub-range of the visible light range. For example, one or more LED modules may emit red light, one or more LED modules may emit green light, and one or more LED modules may emit blue light. Alternatively, the LED modules may emit light in other sub-ranges of the visible light range. The number of sub-ranges of the visible light range in which the LED modules are configured to emit light is variable and may generally include 3 or more different sub-ranges of the visible light range. As explained further below, the particular number and arrangement of LED modules may be selected to provide a desired level of control over the spectrum of emitted flash light.

In some embodiments, the camera controller 150 is adapted to control the intensity of light emitted by the camera flash sub-unit 156. For example, the camera controller 150 may control the level of current drawn by the camera flash sub-unit 156 so that the overall intensity of light emitted by the camera flash sub-unit 156 equals a desired level of light intensity. As another example, the camera controller 150 may control the overall intensity of emitted light by driving a selected subset of the available LED modules with current from the battery 130 to generate light at the desired intensity level.

The camera controller 150 is also adapted to control the color temperature of light emitted by the camera flash sub-unit 156. For example, the camera controller 150 may control the color temperature of the flash light by setting the relative magnitudes of current drawn by the LED modules in different sub-ranges of visible light, as required, to achieve an effective color temperature of light emitted from the camera flash sub-unit 156. A look up table or the like may be used by the camera controller 150 to define a relationship between a given color temperature of the flash light and the required relative magnitudes of the current drawn by the different LED modules.

As another example, the camera controller 150 may control the effective color temperature of the flash light by selectively adjusting the number of LED modules in each of the sub-ranges of visible light that are driven with current from the battery 130. In either case, the camera controller 150 may realize a particular color temperature for the flash light by mixing together two or more light components (e.g., red, green or blue light) in a specified ratio in order to synthesize flash light of a particular spectrum or composition (and which is reflected in the resulting color temperature of the flash light).

In some embodiments, the optional ambient light sensor sub-unit 152 includes ambient light sensor 240, variable gain amplifier (VGA) 242 and digital to analog converter (DAC) 244. The ambient light sensor 240 is used to estimate one or more characteristics of the ambient light, such as a color temperature or an intensity level, which is incident on or in the vicinity of the camera lens sub-unit 154 and that is used to expose the image sensor 252. Different configurations of the ambient light sensor 240 are possible. For example, the ambient light sensor 240 may be implemented using a layer of photovoltaic material, such as selenium or silicon, which generates a voltage proportional to the ALI. Alternatively, the ambient light sensor 240 may be implemented using a photoresistive layer, such as cadmium sulfide, which changes electrical resistance proportional to light exposure.

In either case, the observed parameter (voltage or resistance) may be measured and correlated to a light intensity value used as an estimate of the detected ambient light intensity (ALI). For this purpose, the ambient light sensor 240 generates an ambient light detection signal 246 that provides a real-time indication of ALI, such that changing levels of ALI are communicated by proportionate changes in the level of the ambient light detection signal 246.

While the ambient light detection signal 246 may be continuously generated in some embodiments, alternatively, the ambient light sensor 240 may be operated periodically or intermittently. For example, the ambient light sensor 240 may be configured to output the ambient light detection signal 246 only when the camera unit 148 is activated or operational. Alternatively, the camera controller 150 may control the ambient light sensor 240 to output the ambient light detection signal 246 in response to or triggered by other events or operations of the camera module 148.

The VGA 242 is connected to the ambient light sensor 240 and is used to amplify the level of the ambient light detection signal 246, thereby generating an amplified detection signal 248. The amount of gain provided by the VGA 242 is variable and may be adjusted corresponding to the particular implementation of the ambient light sensor 240.

The adjustable gain of the VGA 242 also provides a calibration mechanism for the ambient light sensor sub-unit 152. For example, the ambient light sensor 240 may be subjected to one or more known ambient light intensities under offline test conditions, and the signal gain of the VGA 242 adjusted until the amplified detection signal 248 matches expected levels to indicate that the ambient light intensities during test conditions are properly detected.

The amplified detection signal 248 is passed into the DAC 244 for signal digitization, e.g. through sampling and quantization. As will be appreciated, the DAC 244 may have different types or configurations depending on the application, such as pulse-width modulation, oversampling, delta-sigma and binary weighted digital to analog converters. Additionally, the DAC 244 may be realized using hardware components, software components or some combination of the two. The DAC 244 outputs an ambient light data signal 250, which is a digitized representation of the amplified detection signal 248. Together with the gain factor of the VGA 242, the ambient light data signal 250 is representative of the ALI detected by the ambient light sensor 240 in a vicinity of the camera unit 148.

In some example implementations, the camera sensor sub-unit 158 rather than the ambient light sensor sub-unit 152 detects the intensity of the ambient light that is incident on or in the vicinity of the camera lens sub-unit 154. In such cases, the camera sensor sub-unit 158 detects the intensity by pre-exposing the image sensor 252 to generate pre-image data. The ISP 257 then reads the magnitude of one or more color component values in the pre-image data to estimate the intensity of the ambient light. Once processed, the intensity of the ambient light estimated by the ISP 257 is contained in the image sensor ambient light data signal 264. The image sensor ambient light data signal 264 is also representative of the ALI detected by the image sensor sub-unit 158 in a vicinity of the camera unit 148.

The ambient light sensor 240 may also be configured to detect an ambient light color temperature (ALCT), in which case the ambient light data signal 250 is also representative of the ALCT. For example, the ambient light data signal 250 may be a multi-dimensional signal comprising two separate signal components, one for each of the intensity and color temperature of the detected ambient light. Alternatively, the ambient light sensor sub-unit 152 may generate separate signals to represent the intensity and color temperature of the detected ambient light. Alternatively, the intensity and color temperature of the detected ambient light may be encoded into a single component of the ambient light data signal 250 using a suitable encoding scheme or suitable codewords.

In some example implementations, the camera sensor sub-unit 158 detects the ALCT instead of the ambient light sensor 240. The camera sensor sub-unit 158 detects the ALCT by processing the pre-image data generated by pre-exposing the image sensor 252. For example, the ISP 257 may sense the magnitudes of the different color component values present in the pre-image data in order to estimate the relative intensities of different components of the ambient light corresponding to different sub-ranges of the visible light range. After processing, the color temperature of the ambient light estimated by the ISP 257 is contained in the image sensor ambient light data signal 264. For example, the image sensor ambient light data signal 264 may be a multi-dimensional signal comprising two separate signal components, one for each of the intensity and color temperature of the detected ambient light. Alternatively, the image sensor sub-unit 152 may generate separate signals to represent ALI and ALCT detected in the vicinity of the camera unit 148. Alternatively, the ALI and ALCT may be encoded into a single component of the image sensor ambient light data signal 264 using a suitable encoding scheme or suitable codewords.

During operation, the camera unit 148 may be initiated. As used herein throughout "camera initiation" may refer to the camera unit 148 entering into a mode of operation after being turned on or, alternatively, switching from a present mode of operation to a new mode of operation. When the camera unit 148 is included on a mobile device 100, camera initiation may also refer to executing the camera module 138 in the flash memory 108 (FIG. 1).

After the camera unit 148 is initiated, the camera controller 150 is configured to wait for receipt of a take picture command, which the user may input to the camera unit 148 using the camera activation input 160, and which may be used for instructing the camera unit 148 to generate a digital image of the exposed scene. After receiving the take picture command, the camera controller 150 controls various sub-units in the camera unit 148, such as the camera sensor sub-unit 158, to generate a digital image according to a particular mode of operation selected for the camera unit 148.

In some embodiments, prior to receipt of the take picture command, the camera controller 150 also controls the various sub-units of the camera unit 148, as explained further below, to perform different processes and other functions that assist in generating the digital image. By scheduling various processes and functions of the camera sub-units to be performed prior to receipt of the take picture command, the camera controller 150 is able to reduce the amount of processing time required after receipt of the take picture command and, thereby, reduce shutter lag.

A first mode of operation selected for the camera unit 148 may include an automatic flash configuration mode, in which the camera controller 150 repeatedly configures and, if necessary, reconfigures the camera flash sub-unit 156 prior to receiving the take picture command. In the automatic flash configuration mode, the camera controller 150 monitors one or more characteristics of the ambient light in a vicinity of the camera unit 148. For example, the camera controller 150 may read a value of the ambient light data signal 250 or image sensor ambient light data signal 264 for this purpose.

By monitoring the one or more characteristics of the ambient light, including prior to receiving the take picture command, the camera controller 150 may consistently have up-to-date information about the one or more monitored characteristics of the ambient light. The camera controller 150 may commence monitoring of the ambient light at any time following initiation of the camera unit 148 and may continue monitoring the ambient light over a time interval up to a point at which the camera controller 150 receives the take picture command. In this way, the camera controller 150 may have reasonably accurate information about the ambient light when the take picture command is received.

The one or more characteristics of the ambient light monitored by the camera controller 150 are generally unlimited, but in some embodiments may include one or both of ALI and ALCT. For embodiments of the camera unit 148 that include the ambient light sensor sub-unit 152, the camera controller 150 may monitor the one or more characteristics of the ambient light using the ambient light detection signal 246. For example, the camera controller 150 may instruct the ambient light sensor 240 to generate the ambient light detection signal 246 repeatedly, including either periodically at time intervals of equal length or intermittently at time intervals of unequal or varying length. The camera controller 150 may monitor the one or more characteristics of the ambient light essentially in real-time by controlling the ambient light sensor 240 to generate the ambient light detection signal 246 at a sufficiently high rate of repetition.

Alternatively, in some embodiments, the camera controller 150 may monitor the one or more characteristics of the ambient light at rates that are generally less than real-time. For example, the camera controller 150 may monitor the one or more characteristics of the ambient light at only discrete intervals ranging into the near past. These discrete time intervals may be substantially equally spaced in time, but in some embodiments may also be spaced unequally in time. As will be appreciated, performing monitoring at discrete intervals decreases the amount of processing time used by the ambient light sensor 240 to generate ambient light detection signal 246, thereby also decreasing the processing required by the camera controller 150 in monitoring the one or more ambient light characteristics. A decrease in processing may allow for lower power consumption of the battery module 130.

For embodiments of the camera unit 148 that omit the ambient light sensor sub-unit 152, the camera controller 150 may monitor the one or more characteristics of the ambient light by exerting control over the camera sensor sub-unit 158. For example, the camera controller 150 may instruct camera sensor sub-unit 158 to repeatedly pre-expose the image sensor 252 to generate the raw digital image data 262 including pre-image data. The ISP 257 may then process the pre-image data, as described above, in order to determine the one or more characteristics of the ambient light. As before, the camera controller 150 may provide instructions either periodically at equal time intervals or intermittently at unequal time intervals depending on how the camera controller 150 is monitoring the ambient light. The ISP 257 processes the pre-image data to determine one or more values that are representative of the one or more characteristics of the ambient light being monitored by the camera controller 150.

During monitoring of the one or more characteristics of the ambient light, the ISP 257 updates old values generated from previous pre-exposures of the image sensor 252 with new values determined from the most recently generated pre-image data. Through this operation, the ISP 257 is able to produce updated values representative of the characteristics of the ambient light, which may be encoded by the ISP 257 in the image sensor ambient light data signal 264 and sent to the camera controller 150 to be monitored. Alternatively, the ISP 257 may encode the pre-image data directly in the image sensor ambient light data signal 264 for equivalent processing by the camera controller 150 to determine the one or more characteristics of the ambient light.

The camera controller 150 may monitor the one or more characteristics of the ambient light essentially in real-time by instructing pre-exposure of the image sensor 252 at a sufficiently high rate. However, as above, the camera controller 150 may alternatively instruct pre-exposure of the image sensor 252 at effectively slower than real-time rates.

In the automatic flash configuration mode, prior to receiving the take picture command, the camera controller 150 repeatedly configures the camera flash sub-unit 156 based on the monitored one or more characteristics of the ambient light. For example, the camera controller 150 may adjust one or more characteristics of the artificial flash light generated and emitted by the camera flash sub-unit 156 based on the monitored one or more characteristics of the ambient light. The camera flash sub-unit 156 may be adjusted so that the flash light emitted by the camera flash sub-unit 156 during exposure of the image sensor 252 mixes with the natural ambient light in a way that is conducive for effective processing of the raw digital image data 262 by the ISP 257 to generate digital images.

One characteristic of the flash light emitted by the camera flash sub-unit 156 that may be adjusted by the camera controller 150 is the intensity of the flash light. Where camera flash intensity is adjusted, the camera controller 150 may configure the camera flash sub-unit 156 based on the monitored ALI so that the intensity of the emitted flash light only partially increases illumination. Since the emitted flash light provides a localized source of generally intense light, full intensity camera flash during exposure of the image sensor 252 may cause objects near to and/or facing the camera flash sub-unit 156 to appear intensely or excessively illuminated in the resulting digital image, while also creating the appearance of shadows behind the intensely illuminated objects. By only partially illuminating the scene image with flash light, the camera controller 150 may reduce or eliminate these deleterious effects.

Partial increase of illumination may be instructed by the camera controller 150 where the ALI is above a first intensity threshold representing an ALI below which a full intensity flash light from the camera flash sub-unit 156 may be used, but is also below a second intensity threshold representing an ALI above which no camera flash may be necessary. The camera flash sub-unit 156 is configurable by the camera controller 150 to adjust the intensity of the emitted flash light corresponding to the monitored ALI. For example, the camera flash sub-unit 156 may be repeatedly configured to adjust the intensity of the flash light to substantially match the monitored ALI. By matching, it is to be understood that the intensity of flash light is adjusted to be approximately the same as the monitored ALI. In the automatic flash configuration mode, the camera controller 150 may adjust the intensity of the flash light emitted by the camera flash sub-unit 156, as mentioned above, by varying the level of current drawn by the camera flash sub-unit 156 or, alternatively, by varying the number of LED modules included in the camera flash sub-unit 156 that receive current.

In some cases, the camera controller 150 may adjust the intensity of flash light emitted by the camera flash sub-unit 156 by reducing the flash output to zero. Accordingly, the camera controller 150 may determine whether or not the camera flash sub-unit 156 will emit any flash light at all to increase illumination during exposure of the image sensor 252. In some cases, where the ALI may be sufficiently high on its own, use of the camera flash sub-unit 156 to increase scene illumination may not be required. For example, where the camera controller 150 determines that the ALI is above the second intensity threshold, the camera controller 150 may encode a flash-off command into a flash control signal 268 sent to the camera flash sub-unit 156 in order to deactivate the camera flash sub-unit 156 during exposure of the image sensor 252. Alternatively, where the camera controller 150 determines that the ALI is below the second intensity threshold, representing an ALI where the flash-emitted light may be utilized to increase illumination, the camera controller 150 encodes a turn flash-on command in the flash control signal 268 sent to the camera flash sub-unit 156 for enabling the camera flash sub-unit 156.

A second characteristic of the artificial flash light emitted by the camera flash sub-unit 156 that may be adjusted by the camera controller 150 is the color temperature of the flash light. It is often difficult to predict the color temperature of light that is generated by the mixing of different light components originating from multiple different sources. Consequently, it will often be difficult for the ISP 257 to select an appropriate algorithm to perform color balancing when processing the raw digital image data 262 to generate digital images, given that color balancing algorithms are typically optimized for homogenous light of a single color temperature.

In some embodiments, the camera controller 150 repeatedly configures and, if necessary, reconfigures the camera flash sub-unit 156 so that the flash light generated and emitted by the camera flash sub-unit 156 has a color temperature that is determined based on the monitored ALCT. For example, the camera flash sub-unit 156 may be configured so that the color temperature of the emitted flash light substantially matches the monitored ALCT. As the monitored ALCT varies, the camera flash sub-unit 156 may be reconfigured to generate and emit light having a color temperature adjusted to match the present ACLT. By matching, it is to be understood that the color temperature of the flash light emitted by the camera flash sub-unit 156 is adjusted to have approximately the same color temperature as the monitored ambient light. In the automatic flash configuration mode, the camera controller 150 may adjust the color temperature of the flash light emitted by the camera flash sub-unit 156, as mentioned above, by controlling the relative intensities of different color components present in the flash light.

By substantially matching the color temperature of the flash light to the monitored ALCT, the camera controller 150 enables the image sensor 252 to be exposed with substantially homogenous light of a single color temperature, even though overall the light is the product of multiple different sources (e.g., ambient and camera flash). The ISP 257 may then also pre-select a suitable algorithm for performing color balancing based on the monitored ALCT. Due to the matching of color temperature, the selected white balancing algorithm may be more effective at rendering colors in the resulting digital image than the selected white balancing algorithm might otherwise have been had the camera flash sub-unit 156 not been pre-configured to emit flash light having a color temperature matched to that of the ambient light.

After receiving the take picture command from the activation input 160, the camera controller 150 controls the camera sensor sub-unit 158 to expose the image sensor 252, which thereby generates the raw digital image data 262 including raw color data for processing by the ISP 257 into a digital image. When the camera unit 148 is operating in the automatic flash configuration mode, the camera controller 150 may also control the camera flash sub-unit 156 to emit a camera flash during exposure of the image sensor 252, if the camera controller 150 determines that the camera flash sub-unit 156 may be operated to increase illumination. As the camera controller 150 pre-configures the camera flash sub-unit 156 prior to receipt of the take picture command, further configuration of the camera flash sub-unit 156 by the camera controller 150 after receipt of the take picture command may be reduced or eliminated altogether. This conserves computing resources for the ISP 257 to process the raw digital image data 262 more efficiently, thereby resulting in reduced shutter lag.

In some embodiments, prior to the camera controller 150 receiving the take picture command, the ISP 257 may also optionally pre-select a color balancing algorithm based on the monitored one or more characteristics of the ambient light. The selected algorithm may then be applied by the ISP 257 to the raw color data during image processing to generate digital images. As the color balancing algorithm is pre-selected by the ISP 257 prior to receipt of the take picture command, computing resources available after receipt of the take picture command are again conserved. As explained further below, the ISP 257 may avoid having to test different candidate white balancing algorithms to determine which algorithm performs superior to others for given ambient light conditions.

The ISP 257 may select one white balancing algorithm to use from a database 266 of white balancing algorithms. In some embodiments, different white balancing algorithms in the database 266 are optimized for different ambient light conditions and the ISP 257 may select the particular algorithm to use based on the monitored one or more characteristics of the ambient light. For example, the ISP 257 may select the algorithm to perform white balancing that most closely corresponds to the monitored ALCT. Because the camera controller 250 monitors the ambient light prior to receipt of the take picture command, the ISP 257 may select the white balancing algorithm to use based on up-to-date information regarding the ambient light. Since the ISP 257 is also able to pre-select the white balancing algorithm prior to receiving the take picture command, available computing resources after receiving the take picture command again may be conserved, which may reduce the amount of processing performed by the camera controller 150 or ISP 257 and reduce shutter lag.

In some embodiments, the monitored characteristics of ambient light may be displayed graphically on a user interface of the camera unit 148. For example, where the camera unit 148 is included on the mobile device 100, the display unit 112 (FIG. 1) may be used for this purpose. For example, a graphic such as a light bulb, a sun, a cloud, house with shadow, or any other object indicative of the ambient light conditions may be displayed. Alternatively, one or more values representative of the monitored characteristics may be displayed. As will be appreciated, color temperature is commonly represented in units of Kelvin, e.g. 3000K or 9000K. Ambient light intensity may also be displayed numerically on the display unit 112 as an equivalent exposure value (EV), which typically ranges from about −2 to 2. Graphical information pertaining to whether the camera flash sub-unit 156 will be operated during scene exposure may also be displayed on the user interface of the camera unit 148.

Displaying the monitored characteristics of the ambient light, or representative values thereof, on the display unit 112 allows the user to know how the camera flash sub-unit 156 will operate during image capture. A user of the camera unit 148 may be able to preview, from the one or more characteristics, how the resulting digital image captured with those settings will appear. For example, a user may be able to decide when to initiate image capture using the camera activation input 160 based on the presently detected ambient light conditions. Additionally, the user may also be able to determine from the information displayed in the user interface if a particular configuration of the camera flash sub-unit 156 would not be suitable for the user's purpose. In such cases, the user may then manually adjust the configuration of the camera flash sub-unit 156.

In some embodiments, the camera unit 148 may be adapted to allow the user to transmit a lock configuration command to the camera controller 150 through the activation input 160. For example, the lock configuration command may be sent when the user depresses an additional push-button of the activation input 160. Alternatively, the camera controller 150 may receive the lock configuration command as input at the user interface. When a lock configuration command is received at the camera controller 150, the camera controller 150 maintains the present configuration of the camera flash sub-unit 156 at current settings.

After the camera flash sub-unit 156 has been locked, the camera controller 150 may cease updating the configuration of the camera flash sub-unit 156 based on newly detected ambient light conditions, although the camera controller 150 may continue to monitor the ambient light conditions in some cases. The lock configuration command may be employed by the user to lock-in a desirable configuration of the flash sub-unit 156 for increasing illumination. For example, based on the information displayed graphically or numerically on the user interface, the user can input a lock configuration command when a desirable configuration of the flash sub-unit 156 is indicated. Accordingly, the lock configuration command may be employed by the user to override any camera flash settings automatically calculated by the camera controller 150.

A second mode of operation for the camera unit 148 may be a manual mode, in which the user manually sets one or more values or controls representative of the monitored characteristics of the ambient light. The user may manually set the one or more values or controls by interacting with one or more buttons or switches on the camera activation input 160, or other input mechanism known by those skilled in the art. The camera controller 150 may control values or controls that the user does not set automatically, as described herein. For example, the user may manually set the camera flash sub-unit 156 to operate during image capture, while leaving the camera controller 150 to automatically adjust the characteristics (e.g., intensity and/or color temperature) of the emitted flash light. As another example, the user may manually set the intensity of the emitted flash light according to how far away the scene object is located from the camera unit 148, while leaving the camera controller 150 to automatically adjust the color temperature of the emitted flash light.

While the camera unit 148 is activated, the user may switch the camera unit 148 between different modes of operation. For example, the user may switch the camera unit 148 between the automatic flash configuration and manual modes as desired. While the camera unit 148 is operated in the automatic flash configuration mode, the user may also employ the lock configuration command to switch the camera flash sub-unit 156 between the locked state in which the present configuration is maintained and the unlocked state in which the camera controller 150 automatically updates the configuration of the camera flash sub-unit 156. The camera unit 148 is thereby enabled for multi-mode operation based on user input.

Figure 5:
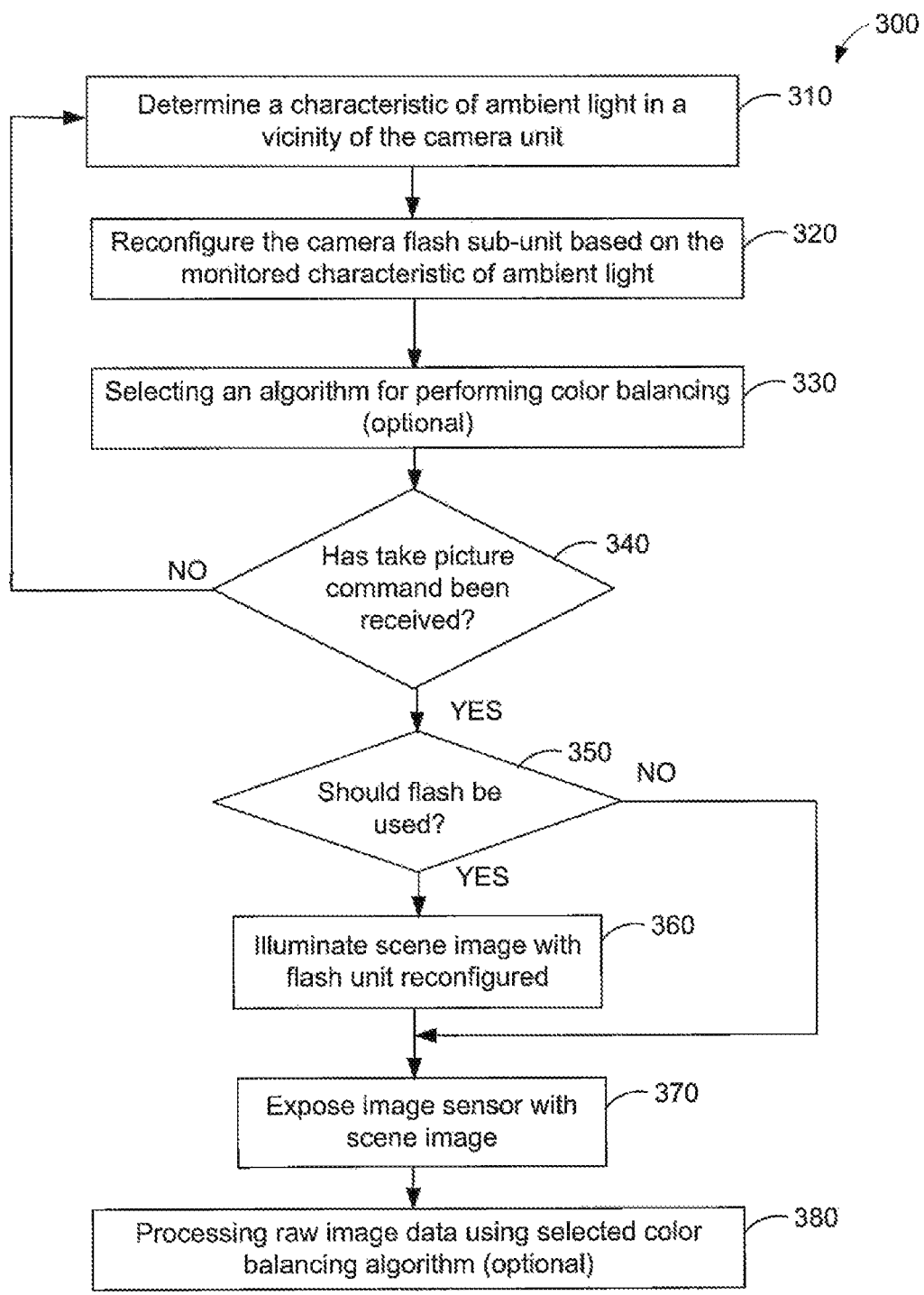
FIG. 5 is a flowchart showing an example method of controlling the camera unit shown in FIG. 1 to generate digital images.

Referring now to FIG. 5, therein is illustrated a method 300 for controlling a camera unit to generate digital images. The method 300 may be performed by one or more components of the camera unit 148 shown in FIG. 4, such as the camera controller 150, image sensor processor 257, and camera activation input 160. Accordingly, the following description of method 300 may be abbreviated for clarity. Further details of the method 300 are provided above with reference to FIG. 4.

At 310, one or more characteristics of the ambient light in the vicinity of the camera unit 148 are determined. For example, an intensity or color temperature of the ambient light may be determined. Moreover, a separate ambient light sensor (e.g., 240 in FIG. 4) or pre-exposure of an image sensor (e.g., 252 in FIG. 4) may be used for this purpose. As will be explained further below, the one or more characteristics of the ambient light may be determined repeatedly or intermittently over a period of time by performing 310 one or more times. At each instance, new values representing the ambient light characteristics may replace old values, in effect, resulting in a continuous or pseudo-continuous monitoring of ambient light conditions.

At 320, a camera flash sub-unit (e.g., 156 in FIG. 4) is configured based on the monitored one or more characteristics of the ambient light to adjust one or more characteristics of the artificial flash light emitted by the camera flash. In some embodiments, one or more characteristics of the camera flash light may be adjusted to match corresponding characteristics of the ambient light. For example, an intensity or color temperature of the camera flash light may be adjusted to match that of the ambient light.

At 330, an algorithm for performing color balancing is optionally pre-selected based on the monitored one or more characteristics of the ambient light.

At 340, it is determined whether a command (e.g., a take picture command) for instructing the camera unit to generate a digital image has been received. If the take picture command has been received, the method 300 proceeds to 350. However, if the take picture command has not been received, the method 300 returns to 310. Accordingly, method 300 may repeatedly cycle through 310, 320 and, optionally, 330 prior to and until a take picture command is received. This cycling results in the ambient light characteristics being monitored, as well as the camera flash being repeatedly configured and, if necessary, reconfigured based on the monitored characteristics of the ambient light.

At 350, it is determined whether or not to operate the camera flash during image exposure in order to increase illumination. If it is determined that camera flash is to be used, the method 300 proceeds to 360 where the camera flash is activated to emit artificially generated flash light during image capture. However, if it determined that no flash light is to be emitted, the method 300 proceeds to 370 where an image sensor (e.g. 252 in FIG. 4) is exposed. Depending on the outcome of the determination in 350, exposure of the image sensor may be assisted by additional illumination provided by the camera flash. Exposure of the image sensor generates raw color data for processing into a digital image.

At 380, the raw color data is optionally processed using the color balancing algorithm pre-selected at 330. Otherwise the raw color data may be processed using other resident image processing functions of the camera, such as exposure compensation, gamma correction, and edge enhancement.

While FIG. 5 presents an example implementation of the method 300, it should be understood that modifications to the number and order of acts explicitly illustrated may be possible. For example, determination of whether the take picture command has been received may be performed at other times and not just between 330 and 350, as shown. In some embodiments, receipt of the take picture command is detected concurrently with any or all of 310, 320 and 330. Additionally, the determination in 350 of whether or not the camera flash will be used may, in some cases, be performed also prior to receipt of the take picture command.

Some example embodiments have been described herein with reference to the drawings and in terms of certain specific details to provide a thorough comprehension of the described embodiments. However, it will be understood that the embodiments described herein may be practiced in some cases without one or more of the described aspects. For example, functions performed by the camera controller 150 may be performed instead on other components of the camera unit 148, such as ISP 257, or microcontroller 102. In some places, description of well-known methods, procedures and components has been omitted for convenience and to enhance clarity. It should also be understood that various modifications to the embodiments described and illustrated herein might be possible. The scope of the embodiments is thereby defined only by the appended listing of claims.

The invention claimed is:

1. A method comprising:
at a camera unit comprising a controller, an image sensor, an activation unit, and a flash unit, in response to receiving at the controller of the camera unit, from the activation unit, a first input, the first input indicative of initiation of the camera unit:
acquiring, from the image sensor, pre-image data;
determining, at the controller, from the pre-image data, an intensity and color temperature of ambient light;
adjusting, using the controller, a respective intensity and respective color temperature of the flash unit based on the intensity and the color temperature of the ambient light; and,
determining, at the controller, whether a second input has been received from the activation unit after the first input, the second input indicative of a command for instructing the camera unit to generate a digital image and, in response to receiving the second input:
controlling, using the controller, the flash unit to emit a flash light having the respective intensity and the respective color temperature as adjusted in response to determining the intensity and the color temperature of the ambient light; and, concurrently,
exposing the image sensor and acquiring, from the image sensor, the digital image.

2. The method of claim 1, wherein the adjusting the respective color temperature comprises matching the respective color temperature of the flash unit to the color temperature of the ambient light.

3. The method of claim 1, wherein the adjusting the respective intensity comprises increasing the respective intensity.

4. The method of claim 1, further comprising:
selecting a color balancing algorithm based on the color temperature of the ambient light; and,
acquiring the digital image by processing raw image data captured by the image sensor using a selected color balancing algorithm.

5. The method of claim 1, further comprising repeating, until the second input is received: the acquiring the pre-image data, the determining the intensity and the color temperature of the ambient light, and the adjusting the respective intensity and the respective color temperature of the flash unit.

6. The method of claim 5, wherein the adjusting the respective intensity and the respective color temperature of the flash unit comprising adjusting the respective intensity and the respective color temperature of the flash unit based on most recently acquired pre-image data.

7. The method of claim 5, wherein the repeating occurs at discrete time intervals.

8. The method of claim 5, wherein the adjusting the respective intensity and the respective color temperature of the flash unit comprising adjusting the respective intensity and the respective color temperature of the flash unit in real time.

9. The method of claim 5, wherein the repeating occurs at discrete time intervals equally spaced in time.

10. The method of claim 1, further comprising providing, at a user interface of the camera unit, an indication of one or more of the intensity and the color temperature of the ambient light.

11. A camera unit comprising:
a controller, an image sensor, an activation unit, and a flash unit, the controller configured to:
in response to receiving at the controller of the camera unit, from the activation unit, a first input, the first input indicative of initiation of the camera unit:
acquire, from the image sensor, pre-image data;
determine from the pre-image data, an intensity and color temperature of ambient light;
adjust a respective intensity and respective color temperature of the flash unit based on the intensity and the color temperature of the ambient light; and,
determine, at the controller, whether a second input has been received from the activation unit after the first input, the second input indicative of a command for instructing the camera unit to generate a digital image and, in response to receiving the second input:
control, using the controller, the flash unit to emit a flash light having the respective intensity and the respective color temperature as adjusted in response to determination of the intensity and the color temperature of the ambient light; and, concurrently,
expose the image sensor and acquire, from the image sensor, the digital image.

12. The camera unit of claim 11, wherein the controller is further configured to: adjust the respective color temperature by matching the respective color temperature of the flash unit to the color temperature of the ambient light.

13. The camera unit of claim 11, wherein the controller is further configured to: adjust the respective intensity by increasing the respective intensity.

14. The camera unit of claim 11, wherein the controller is further configured to:
   select a color balancing algorithm based on the color temperature of the ambient light; and,
   acquire the digital image by processing raw image data captured by the image sensor using a selected color balancing algorithm.

15. The camera unit of claim 11, wherein the controller is further configured to repeat, until the second input is received: acquiring the pre-image data, determining the intensity and the color temperature of the ambient light, and adjusting the respective intensity and the respective color temperature of the flash unit.

16. The camera unit of claim 15, wherein the controller is further configured to: adjust the respective intensity and the respective color temperature of the flash unit by adjusting the respective intensity and the respective color temperature of the flash unit based on most recently acquired pre-image data.

17. The camera unit of claim 15, wherein the controller is further configured to perform the repeating at discrete time intervals.

18. The camera unit of claim 15, wherein the controller is further configured to: adjust the respective intensity and the respective color temperature of the flash unit by adjusting the respective intensity and the respective color temperature of the flash unit in real time.

19. The camera unit of claim 15, wherein the controller is further configured to perform the repeating at discrete time intervals equally spaced in time.

20. The camera unit of claim 11, further comprising a user interface, and wherein the controller is further configured to provide, at the user interface, an indication of one or more of the intensity and the color temperature of the ambient light.

* * * * *